United States Patent [19]

Aranovsky

[11] Patent Number: 5,790,331
[45] Date of Patent: *Aug. 4, 1998

[54] CURRENT CONTROL CIRCUIT AND METHOD FOR PROGRAMMABLE READ WRITE PREAMPLIFIER

[75] Inventor: Anatoly Aranovsky, Los Gatos, Calif.

[73] Assignee: Mitel Semiconductor Americas Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 514,120

[22] Filed: Aug. 11, 1995

[51] Int. Cl.$^6$ .................................................. G11B 5/09
[52] U.S. Cl. ........................................ 360/46; 327/538
[58] Field of Search ............................ 327/538, 540, 327/103, 108, 110, 423; 323/315; 360/46, 67, 77.12, 124, 77.07, 31

[56] References Cited

U.S. PATENT DOCUMENTS 5,339,202  8/1994  Heinz et al. ........................ 360/46

OTHER PUBLICATIONS

Shier, J., "VM7000/VM7200 Application Note: Current Gain of 20 vs. Current Gain of 1 for 5-Volt Read/Write Preamplifiers", VTC, Inc., Jul. 1991.

*Primary Examiner*—Aristotelis M. Psitos
*Assistant Examiner*—Patrick Wamsley
*Attorney, Agent, or Firm*—Fenwick & West LLP

[57] ABSTRACT

Write and read bias current control circuits are programmable through a control port. Both the read head bias DAC and the write DAC are controlled through a control port and both DACs use current as an input reference. The write and the read bias currents have constant reference current components which are set externally. The write and the read bias currents additionally have components which are a product of the reference current and a digital word loaded into an associated one of the DACs.

2 Claims, 9 Drawing Sheets

CURRENT CONTROL CIRCUIT AND METHOD FOR PROGRAMMABLE READ WRITE PREAMPLIFIER

FIELD OF INVENTION

This invention relates generally to current control circuits and methods and more specifically to current control circuits and methods for programmable read write preamplifiers having magnetoresistive read heads.

BACKGROUND OF THE INVENTION

Built-in serial ports in read write integrated circuits are used to control selected functional parameters of read write integrated circuits (ICs) under control of a microcontroller. In such read write ICs, current magnitudes through the write head and bias current through the read magnetoresistive head are established by internal digital to analog converters (DACs) which are controlled by built-in registers that are loaded by microcontroller through a serial port.

Selected existing devices may incorporate a serial port having two built-in DACs. One of the DACs controls the write current, and the other DAC controls the read bias. The read bias DAC uses an on-chip voltage source as a reference level. Accordingly, full scale for the read DAC, ranging from 100 mV to 400 mV, is predefined and invariable. At present, the write current DAC derives its reference current from an on-chip voltage reference and an external (off-chip) resistor. Though write DAC full scale can be changed by an external resistor for example, it often starts without offset at zero. Because of limited DAC resolution of 4-bits, in the typical case, such a configuration results in a coarse adjustment step of about 6.5%, which may preclude optimum write current settings.

It is accordingly desirable to develop a read and write IC which can be used with or without programming a serial port. It is additionally desirable to customize adjustment range for read and write currents.

SUMMARY OF THE INVENTION

According to the present invention, both the read bias DAC and the write DAC are controlled through a selected port and both DACs use current as an input reference. According to the present invention, the write and the read bias currents have constant components which are set externally and components which are a product of the reference current and a digital word loaded into an associated one of the DACs. According to an embodiment of the present invention, DAC resolution is doubled and provides an adjustment range from Iref to (31/16)•Iref, or approximately plus or minus 33 percent. According to an embodiment of the present invention, both full scale output range and offset equal the value of externally controlled current, Iref. According to an embodiment of the present invention, other ratios of offset, range, and reference currents are possible with appropriate current scaling. According to an embodiment of the present invention, the current is permissibly programmed, depending on whether Iref was optimally selected or not. Accordingly, the present invention provides a standard Iref level which is selectively alterable, according to one embodiment, to produce a higher Iref level. Control can thus be exercised in a read/write IC through a serial port, while the IC is otherwise capable of operation without such control.

DESCRIPTION OF THE PREFERRED EMBODIMENT

Figure 1:
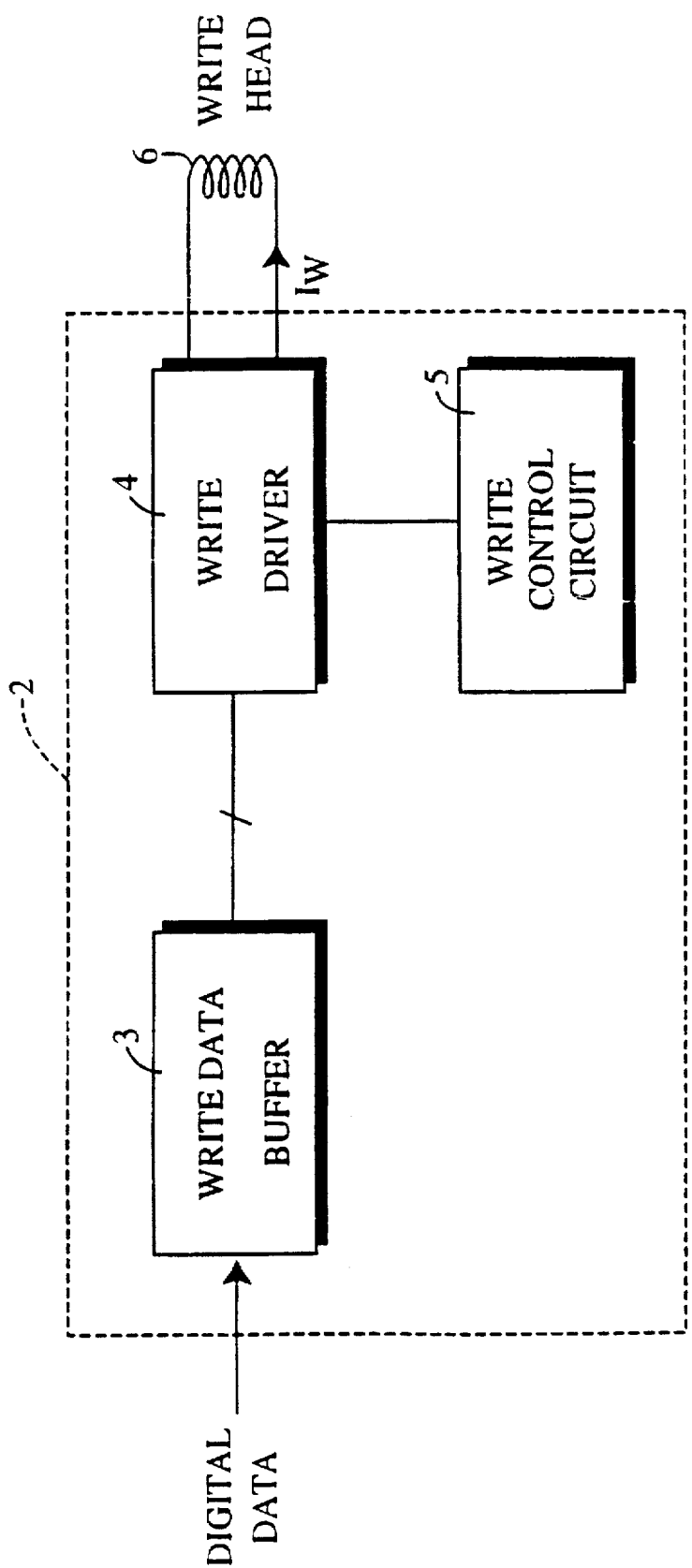
FIG. 1 is a block diagram of a conventional write preamplifier circuit for receiving digital data into a write data buffer for delivery to a write driver which switches a controllable write current trough a write head under, control of a write control buffer.

FIG. 1 is a diagram of a conventional write preamplifier circuit 2 including a write data buffer 3, a write driver circuit 4, and a write control circuit 5. Write preamplifier circuit 2 drives a write head 6. More particularly, write data buffer 3 receives digital data for delivery to write driver 4 for switching a controllable write current through write head 6, under control of write control circuit 5.

Figure 2A:
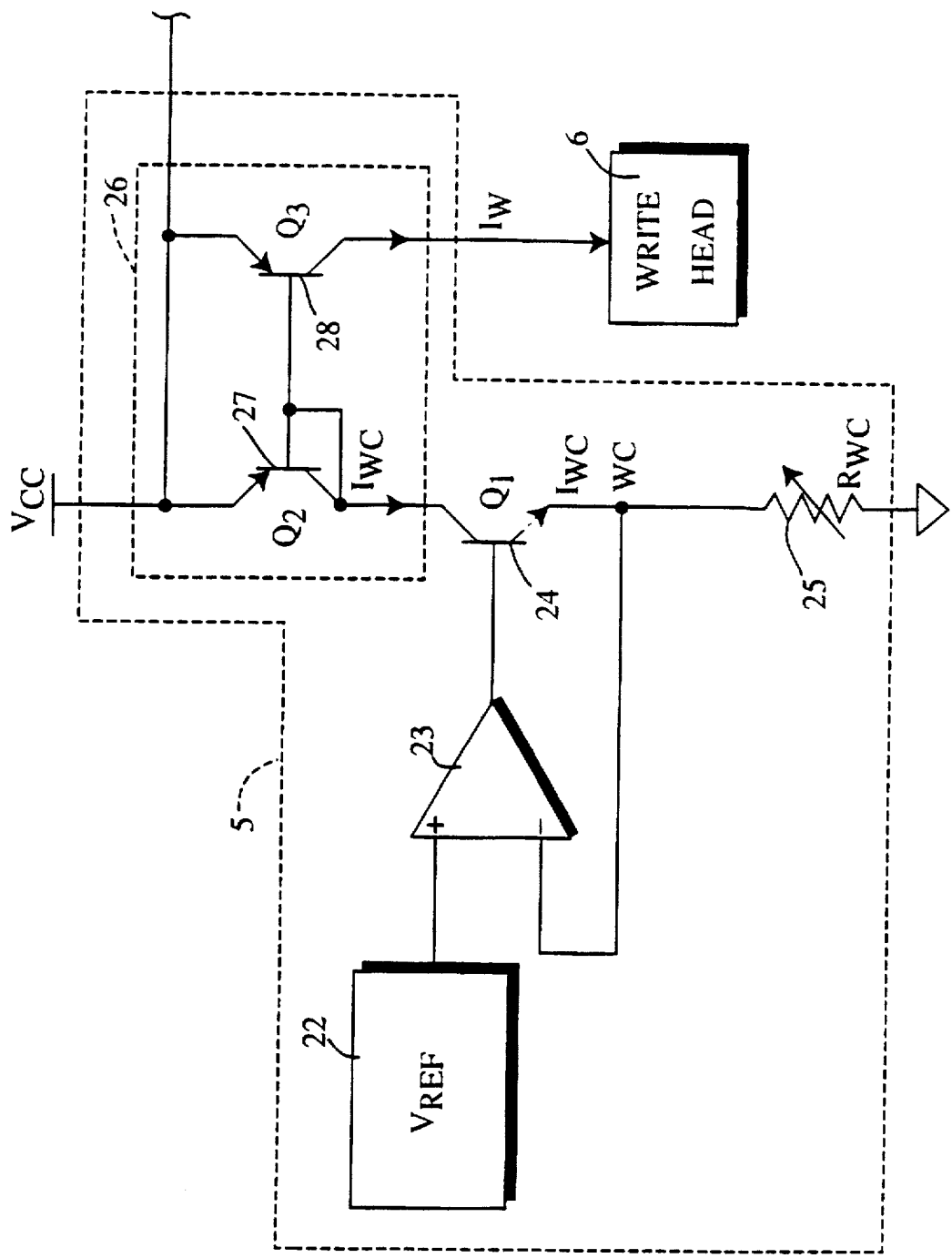
FIG. 2a is a diagram of a conventional write control circuit that controls the value of the write current, and includes a reference voltage source Vref, an operational amplifier U1, and a bipolar transistor, Q1, followed by a current mirror circuit including first and second transistors Q2 and Q3.

FIG. 2a is a diagram of a conventional write control circuit 5 that controls the level of the write current in write head 6. In particular, write control circuit 5 includes a reference voltage source 22, i.e., Vref, an operational amplifier 23, and a bipolar junction transistor 24, i.e., Q1, variable resistor 25, and a current mirror circuit 26. Bipolar junction transistor 24 includes base, emitter, and collector connections. Current mirror circuit 26 includes first and second bipolar junction transistors 27 and 28, respectively Q2 and Q3. Bipolar junction transistors 27 and 28 each include base, emitter, and collector connections. Operational amplifier 23 includes inverting and non-inverting inputs, respectively designated "−" and "+". Operational amplifier 23 includes an output as well. Reference voltage source 22 is connected to the non-inverting input of operational amplifier 23. The output of operational amplifier 23 is connected to the base of transistor 24. The emitter of transistor 24 is connected to the inverting connection of operational amplifier 23. Variable resistor 25 is connected at node WC to the emitter of transistor 24 and the inverting input to operational amplifier 23. The bases of transistors 27 and 28 are connected to each other. Transistor 28 produces an output write current $I_W$ for write head 6, which is a direct function of the resistance value of selected resistor 25.

Figure 2B:
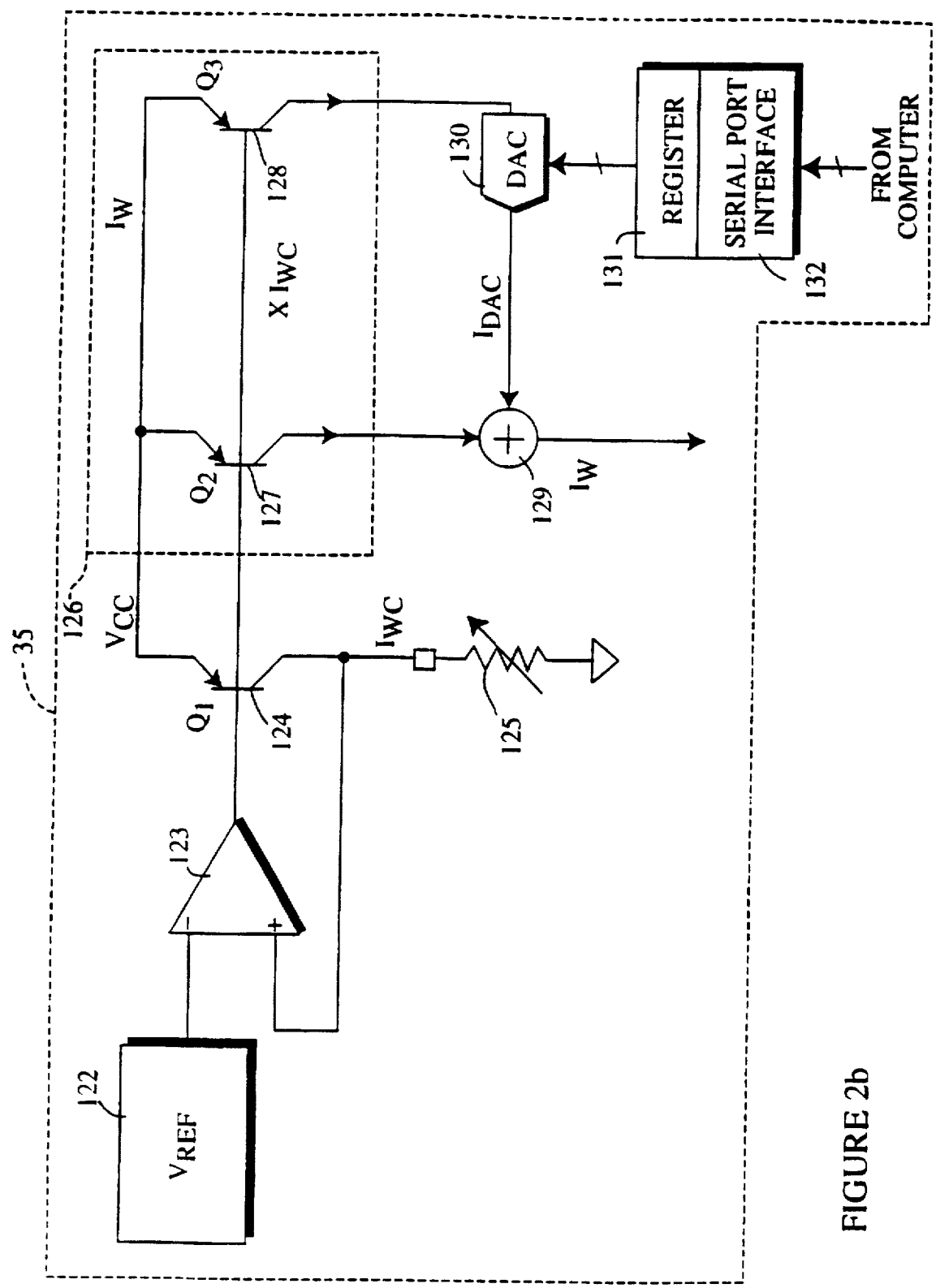
FIG. 2b is a diagram of a write control circuit according to the present invention, that controls the value of the write current, and includes a reference voltage source Vref, an operational amplifier U1, and a bipolar transistor, Q1, followed by a current mirror circuit including first and second transistors Q2 and Q3.

FIG. 2b is a diagram of a write-control circuit 35 according to the present invention that controls the level of the write current in write head 6. In particular, write control circuit 35 includes a reference voltage source 122, i.e., Vref, an operational amplifier 123, and a bipolar junction transistor 124, a variable resistor 125, a current mirror circuit 126, a summing node 129, a digital to analog converted 130, a register 131, and a serial port interface 132. Bipolar junction transistor 124 includes base, emitter, and collector connections. Current mirror circuit 126 includes first and second bipolar junction transistors 127 and 128, respectively Q2 and Q3. Bipolar junction transistors 127 and 128 each include base, emitter, and collector connections. Operational amplifier 123 includes an output, aid inverting and non-inverting inputs, respectively designated "−" and "+". Reference voltage source 122 is connected to the inverting input of operational amplifier 123. The output of operational amplifier 123 is connected to the base of transistor 124. The collector of transistor 124 is connected to the non-inverting connection of operational amplifier 123. Variable resistor 125 is connected at node WC to the collector of transistor 124 and the non-inverting input to operational amplifier 123. The bases of transistors 127 and 128 are connected to each other and to the base of transistor 124. The outputs of transistor 127 and DAC 130 combine at summing node 129 to produce an output write current $I_W$. DAC 130 is controlled by register 131 and serial port interface 132 in response to direction from a computer (not shown) to determine the amount of current from transistor 128 that is transmitted to summing node 129 to produce write current $I_W$ as a function of the characteristics of transistors Q2 and Q3 and the register control of DAC 130. These factors can be considered to be the functions which control the output write current.

Figure 3:
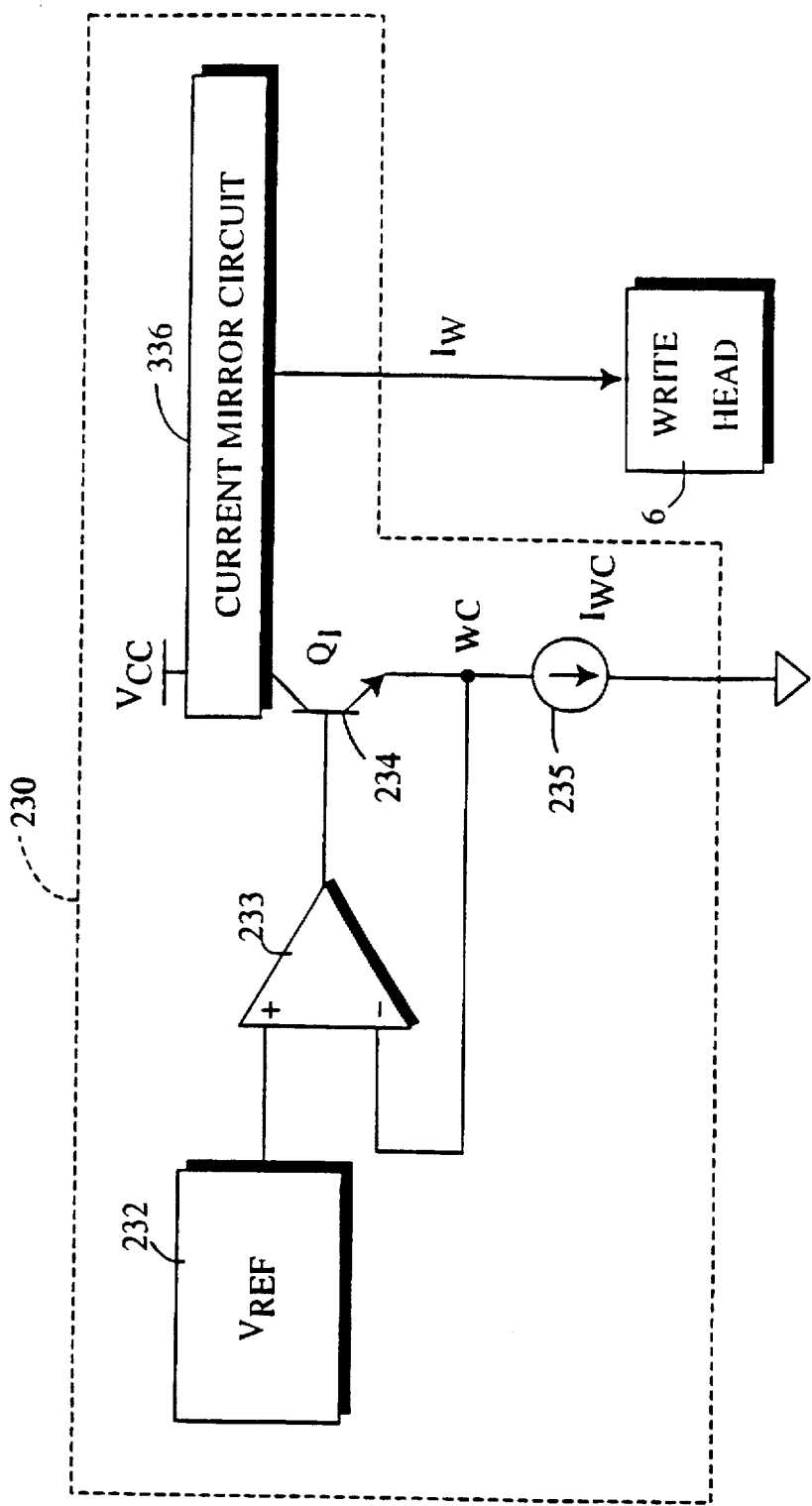
FIG. 3 is a diagram of a conventional write control circuit, that controls the value of the write current, and includes a reference voltage source Vref, an operational amplifier U1, and a bipolar transistor, Q1, followed by a current source that is set externally.

FIG. 3 is a diagram of a conventional write control circuit 230 that controls the level and polarity of the write current in write head 6. In particular, write control circuit 230 includes a reference voltage source 232, i.e., Vref, an operational amplifier 233, and a bipolar junction transistor 234, i.e., Q1, variable current source 235, and a current mirror circuit 336. Bipolar junction transistor 234 includes base, emitter, and collector connections. Current mirror circuit 336 includes first and second bipolar junction transistors as in FIG. 2a. Operational amplifier 233 includes inverting and non-inverting inputs, respectively designated "−" and "+". Operational amplifier 233 includes an output as well. Reference voltage source 232 is connected to the non-inverting input of operational amplifier 233. The output of operational amplifier 233 is connected to the base of transistor 234. The emitter of transistor 234 is connected to the inverting connection of operational amplifier 233. Variable current source 235 is connected at node WC to the emitter of transistor 234 and the inverting input to operational amplifier 233. Current mirror circuit 226 produces an output write current $I_W$ for write head 6.

Figure 4:
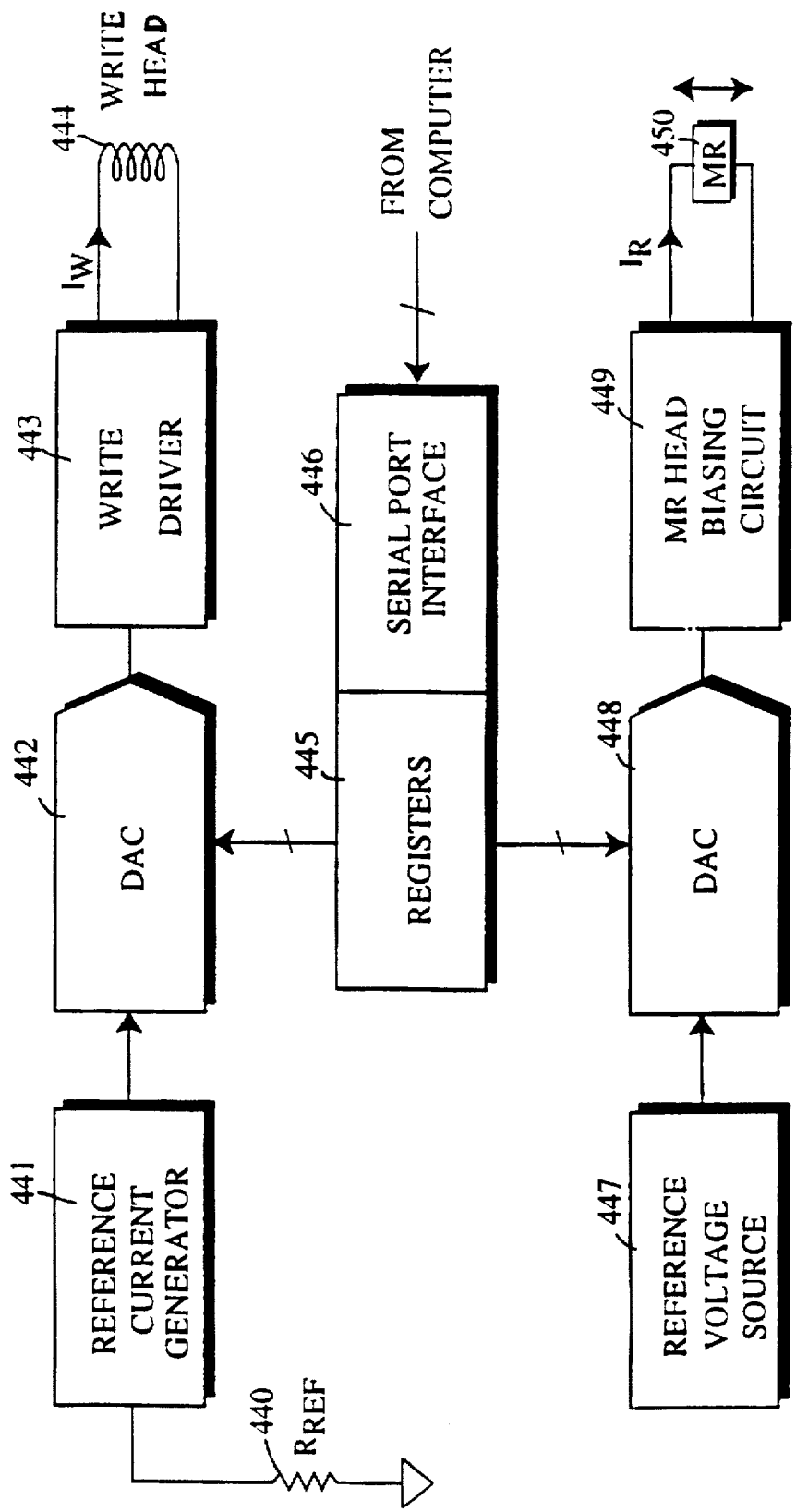
FIG. 4 is a diagram according to the prior art showing first and second DACs respectively controlled by a reference current generator and a reference voltage source, respectively to drive a write driver and a magnetorestrictive head biasing circuit, these respectively driving a write head and a magnetorestrictive head.

FIG. 4 is a diagram according to the prior art showing a reference resistor 440, a reference current generator 441, a first DAC 442, a write driver circuit 443, a write head 444, registers 445, a serial port interface 446, a reference voltage source 447, a second DAC 448, a magnetoresistive head biasing circuit 449, and a magnetoresistive head 450. Reference resistor 440 is connected to reference current generator 441, which in turn is connected to DAC 442. Further, DAC 442 is connected to write driver circuit 443 which supplies write currents to a coil in write head 444. Reference voltage source 447 is connected to second DAC 448 which in turn is connected to magnetoresistive head biasing circuit 449 that is in turn connected to magnetoresistive head 450 to provide it with biasing currents IR. Registers 445 provide control signal to first and second DACs 442 and 448 to control the respective output signals from DACs 442 and 448 to write driver circuit 443 and magnetoresistive head biasing circuit 449 in order to set currents $I_W$ and IR. The outputs from registers 445 are controlled by serial port interface 446 and in turn from a computer (not shown).

Figure 5:
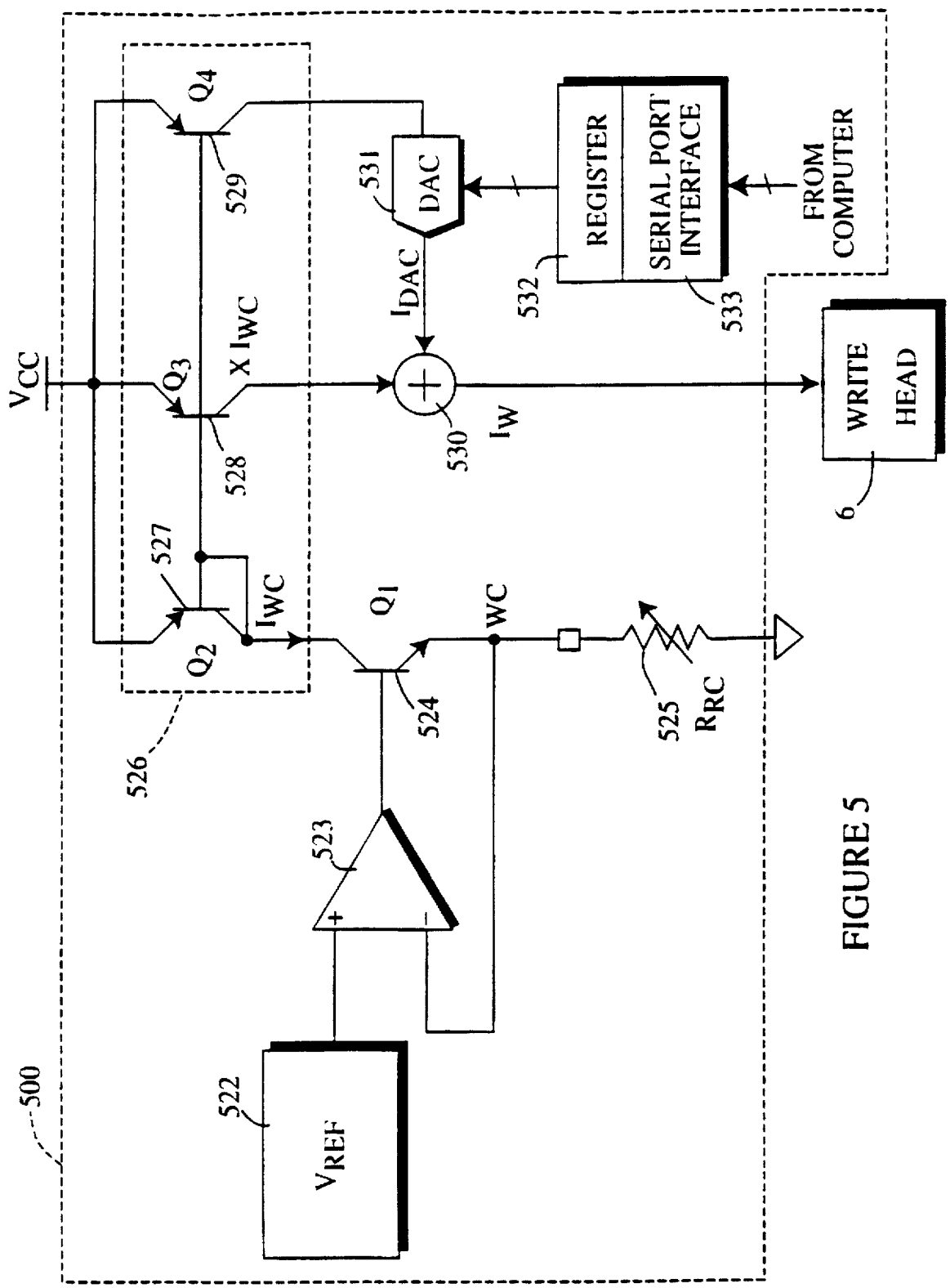
FIG. 5 is a diagram of a write control circuit according to the present invention that controls the value of the write current, and includes a reference voltage source Vref, an operational amplifier U1, and a bipolar transistor, Q1, followed by a current mirror circuit including first and second transistors Q2 and Q3, and further includes a current mirror output at the collector of a transistor Q4, a DAC, a serial interface circuit including a register, and a summing stage.

FIG. 5 is a diagram of a write control circuit 500 according to the present invention that controls the level of the write current $I_W$ in write head 6. In particular, write control circuit 500 includes a reference voltage source 522, i.e., Vref, an operational amplifier 523, and a bipolar junction transistor 524, a variable resistor 525, a current mirror circuit 526, a summing node 530, a digital to analog converter 531, a register 532, and a serial port interface 533. Bipolar junction transistor 524 includes base, emitter, and collector connections. Current mirror circuit 526 includes first, second, and third bipolar junction transistors 527, 528, and 529, respectively Q2, Q3, and Q4. Bipolar junction transistors 527, 528, and 529 each include base, emitter, and collector connections. Operational amplifier 523 includes an output, and inverting and non-inverting inputs, respectively designated "−" and "+". Reference voltage source 522 is connected to the non-inverting input of operational amplifier 523. The output of operational amplifier 523 is connected to the base of transistor 524 having an emitter which is connected to the inverting connection of operational amplifier 523. Variable resistor 525 is connected at node WC to the connector of transistor 124 and to the inverting input of operational amplifier 523. The bases of transistors 527, 528, and 529 are connected to each other and to the collector of transistor 524. The outputs of transistor 528 and DAC 531 combine at summing node 530 to produce an output write current $I_W$ for write head 6. DAC 531 is controlled by register 532 and serial port interface 533 in response to direction from a computer (not shown) to determined the amount of current from transistor 529 which is transmitted to summing node 530 to produce write current $I_W$ for write head 6.

Figure 6:
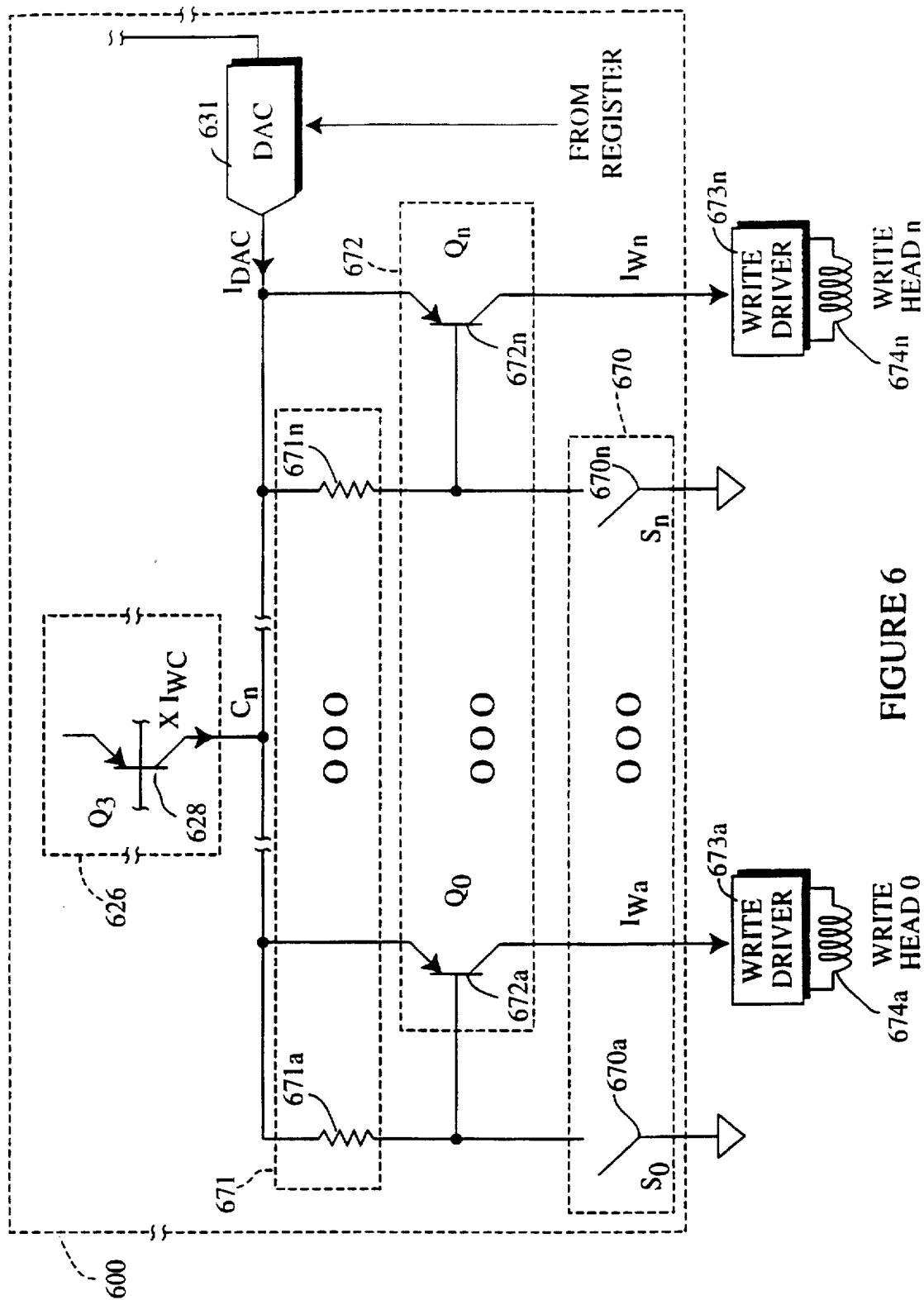
FIG. 6 is a diagram of circuitry according to the present invention including switching circuitry that permits selection of any of a plurality of write drivers and associated write heads.

FIG. 6 is a diagram of a portion of a write control circuit 600 according to the present invention that controls the level of write currents $I_{Wa}$ through $I_{Wn}$. In particular, write control circuit 600 includes a reference voltage source, an operational amplifier, a bipolar junction transistor, a variable resistor, as in FIG. 2b, a current mirror circuit 626, a common node 630, a digital to analog converter 631, a register (not shown) which drives digital to analog converter 631, a serial port interface (not shown) connected to register 532, and first through third corresponding pluralities of switches 670, resistors 671, and transistor 672. Each plurality of switches 670 includes switches 670a through 670n, where "n" indicates the number of switches. Each plurality of resistors 671 includes resistors 671a through 671n, where "n" indicates the number of resistors. Each plurality of transistors 672 includes transistors 672a through 672n, where "n" indicates the number of transistors. Each transistor 672k for k=a, n is connected between node 630 and a corresponding one of write driver circuits 673k. Further, each write driver circuit 673k is connected to a corresponding write head 674k. A particular transistor 672k is turned on by switching closed a corresponding switch 670k, causing electric current to flow to corresponding write drive 673k and through corresponding resistor 671a. Current mirror circuit 626 includes bipolar junction transistors, including transistors Q3 (i.e., bipolar junction transistor 628) and Q4 (connected as shown in FIG. 5, for example). Each of the bipolar junction transistors including transistor 628 includes a base, emitter, and collector connection. The outputs of transistor 628 and DAC 631 combine at common node 630 to produce an output write current $I_W$ for write head 6. DAC 631 is controlled by a register and serial port interface (connected as shown in FIG. 5, for example) in response to direction from a computer to determine the amount of current from transistor 628 which is transmitted to common node 630 to produce a selected one of write currents IWk for a corresponding write head 674k.

Figure 7:
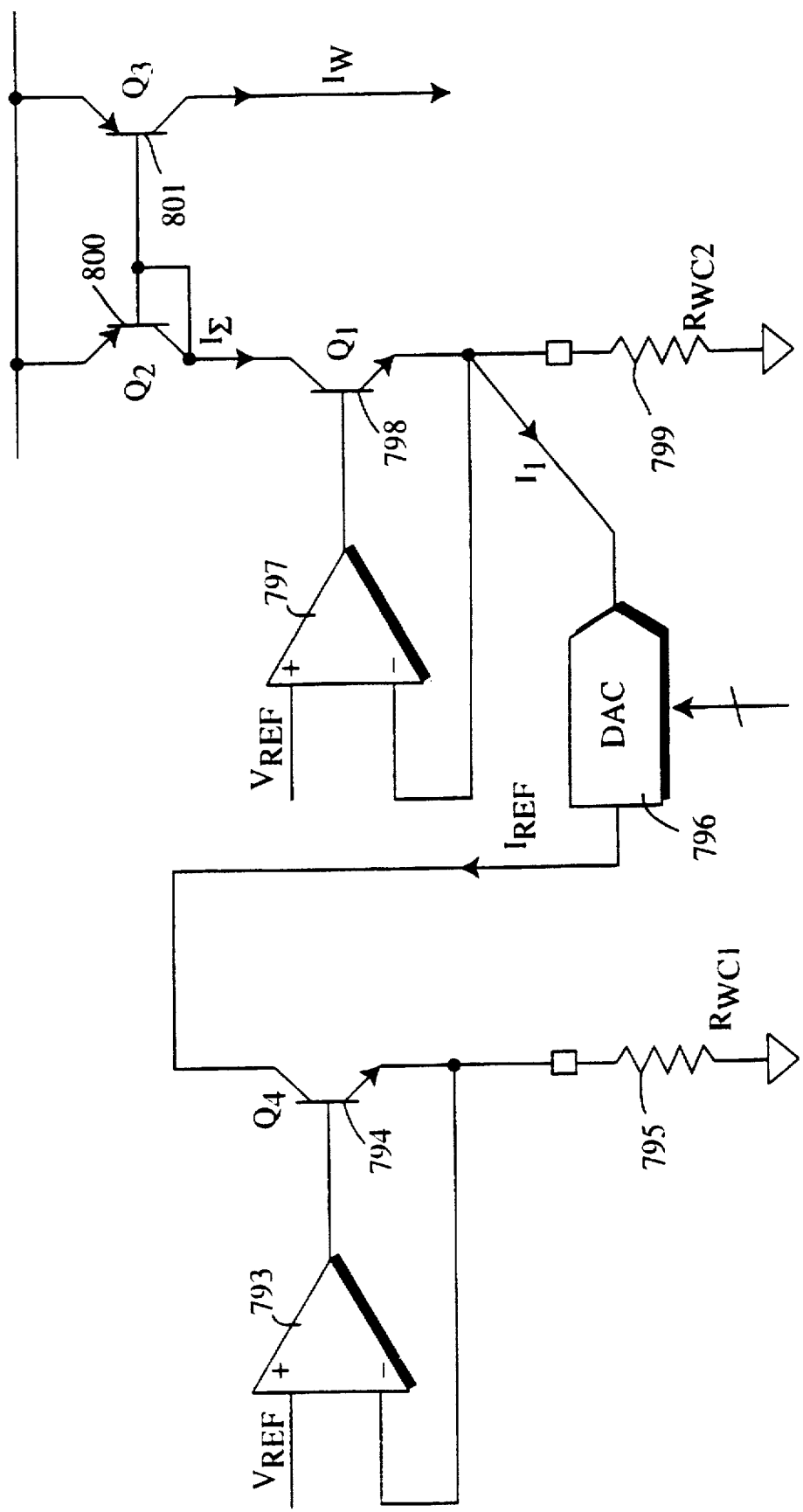
FIG. 7 is a diagram of a write control circuit according to the present invention that controls the value of the write current, and includes a reference voltage source Vref, first and second operational amplifiers, first and second bipolar transistors, Q4 and Q1, followed respectively by a current mirror circuit including first and second transistors Q2 and Q3, and a DAC.

FIG. 7 is a diagram of a write control circuit according to the present invention that controls the value of the write current, and includes a reference voltage source Vref, first and second operational amplifiers, 793 and 797, respectively U1 and U2, first and second bipolar transistors 794 and 798, respectively Q4 and Q1, followed respectively by a transistor circuit including first and second transistors 800 and 801, respectively Q2 and Q3, and a DAC 796. A programmable resistor 795 ($R_{WC1}$) is connected to the emitter of transistor 794. A programmable resistor 799 ($R_{WC2}$) is connected to the emitter of transistor 798. DAC 796 is connected to the emitter of transistor 798 to draw a programmable current, $I_1$. DAC 796 is connected to the collector of transistor 794 to draw a reference current, $I_{REF}$. Accordingly, if a user wishes to set a programmable range through circuitry including elements as shown in FIG. 5 including register 532 and serial port interface 533, by insertion of a resistor 795 of selected value, then the programmable write current range is set by the resistance selected. If the user wishes not to select a programmable range through circuitry including elements as shown in FIG. 5 including register 532 and serial port interface 533, then the write current is determined solely by resistor 799.

Figure 8:
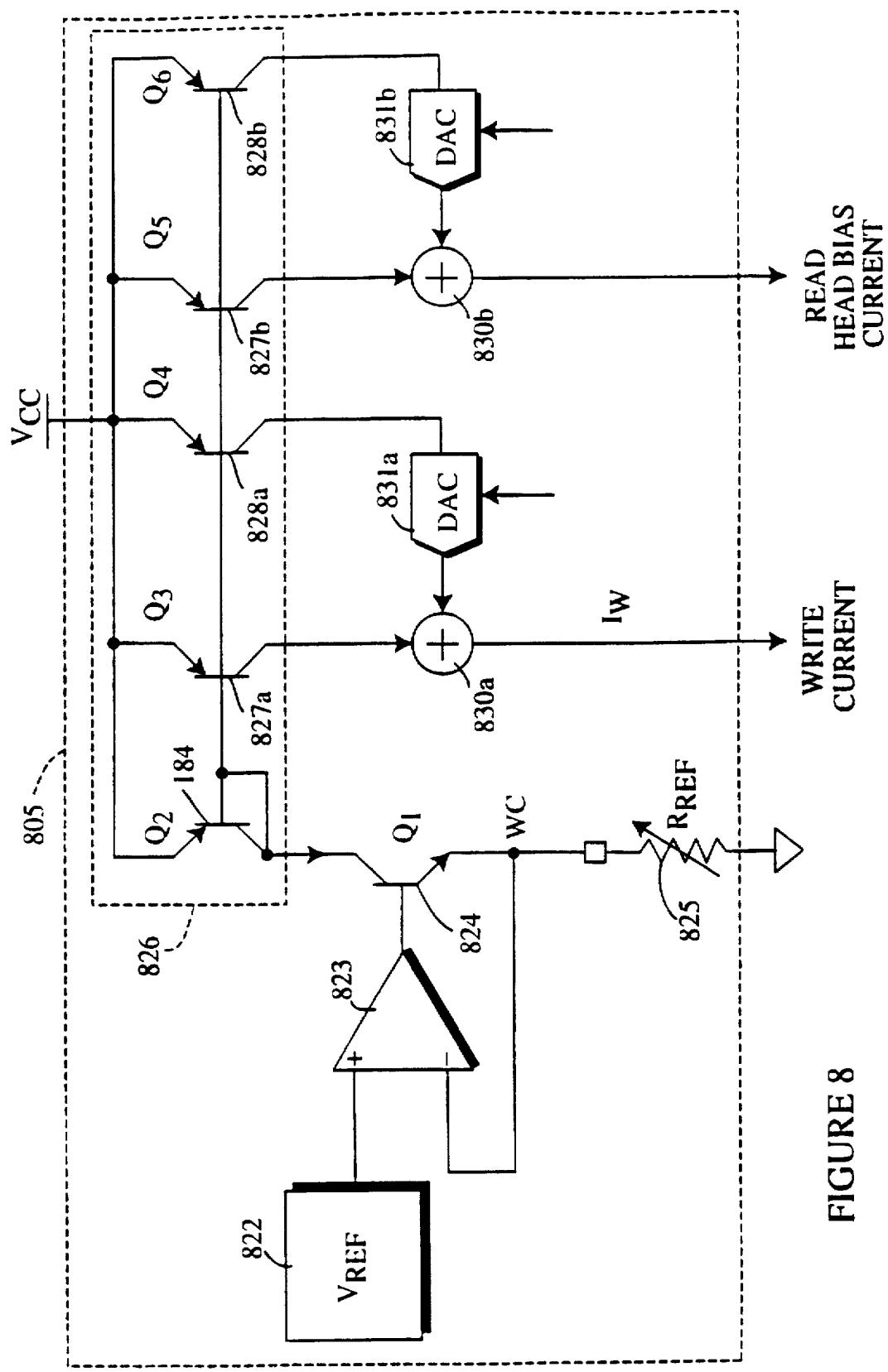
FIG. 8 is a diagram of a combined write and read head bias current control circuit according to the present invention that controls the values of read and write currents, and includes a reference voltage source Vref, an operational amplifier U1, and a bipolar transistor, Q1, followed by a current mirror circuit including first and second transistors Q2 and Q3 and third, fourth, and fifth transistors respectively Q4, Q5 and Q6, and further includes current mirror outputs respectively at the collectors of respective transistors Q4, Q5 and Q6, respective first and second DACs, and respective first and second summing stages.

FIG. 8 is a diagram of a write control circuit 805 according to the present invention that controls the level of both the write current $I_W$ in a write head (not shown) and a read head bias current IR. In particular, write control circuit 805 includes a reference voltage source 822, i.e., Vref, an operational amplifier 823, and a bipolar junction transistor 824, a variable resistor 825, a current mirror circuits 826, first and second summing nodes 830a and 830b, first and second digital-to-analog converters 831a and 831b, and a register and a serial port interface as shown in FIG. 5. Bipolar junction transistor 824 includes base, emitter, and collector connections. Current mirror circuit 826 includes first, second, third, and fourth bipolar junction transistors 827a, 827b, 828a, and 828b. Bipolar junction transistors 827a, 827b, 828a, and 828b each include base, emitter, and collector connections. Operational amplifier 823 includes inverting and non-inverting inputs, respectively designated "−" and "+". Operational amplifier 823 includes an output as well. Reference voltage source 822 is connected to the inverting input of operational amplifier 823. The output of operational amplifier 823 is connected to the base of transistor 824. The emitter of transistor 824 is connected to the inverting connection of operational amplifier 823. Variable resistor 825 is connected at node WC to the emitter of transistor 824 and to the non-inverting input of operational amplifier 823. The bases of transistors 827a, 827b, 828a, and 828b are connected to each other and to the collector of transistor 824. The outputs of transistor 827a and DAC 831a combine at summing node 830a to produce an output write current $I_W$ for a write head (not shown). DAC 831a is controlled by a register and serial port interface (connected as shown in FIG. 5, for example) in response to direction from a general or specific purpose computer or control circuit. In particular, DAC 831a determines the amount of current from transistor 828a which is transmitted to summing node 830a to produce write current $I_W$ for a write head (not shown).

As shown in FIG. 8, the outputs of transistor 827b and DAC 831b combine at summing node 830b to produce an output write current $I_W$ for a selected write head as referenced above in connection with earlier figures and the accompanying text. DAC 531b is controlled by a register and a serial port interface, as also indicated above, in response to direction from a computer or controller, connected for example as shown in FIG. 5. Accordingly, the amount of current from transistor 828b is determined and is transmitted to summing node 830b to contribute to the production of a read head bias current. Thus, a selected resistor 825 can determine the general range of both the write current and the read head bias current subject to specific programming input independently provided for the write current through DAC 831a and for the read head bias current through DAC 831b. This permits considerable non-design, ad-hoc control and flexibility of specific circuit parameters which is not believed heretofore to have been known or available.

What is claimed is:

1. A write control circuit for controlling the value of a write current for a write head in a magnetic disk drive; comprising:

an operational amplifier having inverting and non-inverting inputs and an output;

a reference voltage source connected to the inverting input of said operational amplifier;

a first bipolar junction transistor circuit including a resistor and a first bipolar junction transistor having a first collector, and a first emitter, and a first base connected to the output of said operational amplifier and said first collector being connected to the non-inverting input of said operational amplifier;

a second bipolar junction transistor circuit producing a substantially constant write current component which is a first function of said resistor, said second bipolar junction transistor circuit having a second base, a second collector, and a second emitter, said second emitter connected to said first emitter and said second base connected to said first base;

a third bipolar junction transistor circuit providing a digital to analog converter (DAC) reference current which is a second function of said selected resistor, said third bipolar junction transistor circuit having a third base, a third collector, and a third emitter, said third emitter connected to said second emitter and said third base connected to said second base;

a DAC circuit having a control input, for producing a programmable write current component, said DAC circuit being connected to said third collector of said third bipolar junction transistor circuit to determine a variable write current component; and a summation element, connected to said second collector and said DAC circuit, for combining write current contributions from said second bipolar junction transistor circuit and said DAC circuit for producing a combined write current for driving said write head.

2. The method of controlling electric current in a write head of a magnetic recording transducer, comprising:

producing a reference signal for input into an operation amplifier;

receiving a feedback signal at said operation amplifier;

generating an amplified signal from said operational amplifier to power a current mirror circuit having a first transistor and a second transistor, said first transistor to produce a first current;

producing a second current from a digital-to-analog converter, said second current derived from said second transistor;

summing said first current and said second current at a summation node to produce an output write current; and supplying said output write current to said write head.

* * * * *